(12) United States Patent
Zhang et al.

(10) Patent No.: US 8,010,667 B2
(45) Date of Patent: *Aug. 30, 2011

(54) ON-ACCESS ANTI-VIRUS MECHANISM FOR VIRTUAL MACHINE ARCHITECTURE

(75) Inventors: Yufeng Zhang, Santa Clara, CA (US); Xiaoxin Chen, Cupertino, CA (US); Bich Cau Le, San Jose, CA (US); Jagannath Gopal Krishnan, Harper Woods, MI (US); Derek Uluski, Boston, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,498

(22) Filed: Aug. 12, 2010

(65) Prior Publication Data

US 2010/0306849 A1 Dec. 2, 2010

Related U.S. Application Data

(63) Continuation of application No. 11/955,265, filed on Dec. 12, 2007, now Pat. No. 7,797,748.

(51) Int. Cl.
*G06F 15/16* (2006.01)
(52) U.S. Cl. .......................................... 709/224; 726/24
(58) Field of Classification Search .......... 709/200–203, 709/217–227; 726/24
See application file for complete search history.

(56) References Cited

U.S. PATENT DOCUMENTS

| | | | | |
|---|---|---|---|---|
| 6,021,510 | A * | 2/2000 | Nachenberg | 714/38.14 |
| 7,617,534 | B1 * | 11/2009 | Szor et al. | 726/22 |
| 2005/0204357 | A1 * | 9/2005 | Garg et al. | 718/1 |
| 2005/0216759 | A1 * | 9/2005 | Rothman et al. | 713/200 |
| 2006/0136910 | A1 * | 6/2006 | Brickell et al. | 718/1 |
| 2006/0136911 | A1 * | 6/2006 | Robinson et al. | 718/1 |
| 2008/0178290 | A1 * | 7/2008 | Besch et al. | 726/22 |
| 2011/0047618 | A1 * | 2/2011 | Evans et al. | 726/23 |

OTHER PUBLICATIONS

U.S. Appl. No. 11/584,178, filed Oct. 20, 2006, titled "Isolating Data Within a Computer System Using Private Shadow Mappings." See, ¶ 197-198, showing implementing virus scanning outside context of a VM.

* cited by examiner

*Primary Examiner* — Moustafa M Meky

(57) ABSTRACT

A tangible medium embodying instructions usable by a computer system to protect a plurality of guest virtual machines (VMs), which execute via virtualization software on a common host platform, from malicious code is described. A scan engine is configured to scan data for malicious code and determine a result of the scanning, wherein the result indicates whether malicious code is present in the data. A driver portion is configured for installation in an operating system of a target VM, which is one of the guest VMs. The driver portion intercepts an access request to a file, that originates within the target VM. The driver portion communicates information identifying a location of the data to be scanned by the scan engine without sending a copy of the data to the scan engine. The scan engine executes within the virtualization layer outside a context of the target VM.

43 Claims, 7 Drawing Sheets

ON-ACCESS ANTI-VIRUS MECHANISM FOR VIRTUAL MACHINE ARCHITECTURE

CLAIM OF PRIORITY

This Application is a continuation of and claims priority to U.S. patent application Ser. No. 11/955,265, filed on Dec. 12, 2007, which is incorporated herein by reference in its entirety.

BACKGROUND

Virtualization

As is well known in the field of computer science, a virtual machine is an abstraction—a "virtualization"—of an actual physical computer system. FIGS. 1A and 1B show two possible arrangements of virtualization software in a computer system 70 that implements virtualization. A virtual machine or "guest" 20 is installed on a "host platform," or simply "host," which will include system hardware 10 and one or more layers or co-resident components comprising system-level software, such as an operating system or similar kernel, or a virtual machine monitor or hypervisor as described in more detail below, or some combination of these. The system hardware typically includes one or more processors 11, memory 13, some form of mass storage 14, and various other devices 17.

Each VM 20, . . . , 20-$n$ will typically have both virtual system hardware 28 and guest system software 29. The virtual system hardware typically includes at least one virtual CPU 21-0-21-$m$, virtual memory 23, at least one virtual disk 24, and one or more virtual devices 27. Note that a disk—virtual or physical—is also a "device," but is often considered separately because of the important role of the disk. All of the virtual hardware components of the VM may be implemented in software using known techniques to emulate the corresponding physical components. The guest system software includes a guest operating system (OS) 22 and drivers 25 as needed for the various virtual devices 27.

A single VM may be configured with more than one virtualized processor. To permit computer systems to scale to larger numbers of concurrent threads, systems with multiple CPUs have been developed. These symmetric multi-processor (SMP) systems are available as extensions of the PC platform. Essentially, an SMP system is a hardware platform that connects multiple processors to a shared main memory and shared I/O devices. Virtual machines may also be configured as SMP VMs. FIGS. 1A and 1B, for example, illustrate multiple virtual processors 21-0, 21-1, . . . , 21-$m$ (VCPU0, VCPU1, . . . , VCPUm) within the VM 20.

Yet another configuration is found in a so-called "multi-core" architecture, in which more than one physical CPU is fabricated on a single chip, each core having its own set of functional units (such as registers, L2 caches, arithmetic/logic units (ALUs), etc.) and can execute threads independently. Multi-core processors typically share certain resources, such as L2 and/or L3 caches. Still another technique that provides for simultaneous execution of multiple threads is referred to as "simultaneous multi-threading," in which more than one hardware thread operates simultaneously on a single processing core.

Each guest VM executes on system hardware 10 and physical CPU(s) 11 in its own "context," which is provided by an underlying virtualization software layer. A "context" generally includes the state of all virtual address space, as well as the set of registers (including privilege registers), with all hardware exception and entry points. Thus, although they share system resources, each guest VM is isolated from one another and from the underlying virtualization software. Furthermore, if the virtualization system is properly designed, applications 26 running on each VM will function as they would if run directly on a physical computer, even though the applications are running at least partially indirectly on virtual system hardware 28. Executable files will be accessed by guest OS 22 from the virtual disk 24 or virtual memory 23, which are mapped to portions of the actual physical disk 14 or memory 13, respectively, which portions are allocated to that VM by the virtualization software layer. The design and operation of virtual machines are well known in the field of computer science.

The virtualization software layer, also referred to herein as "virtualization layer" or "virtualization software," may include one or more software components and/or layers, possibly including one or more of the software components known in the field of virtual machine technology as "virtual machine monitors" (VMMs), "hypervisors," "host operating systems," or virtualization "kernels." Because terminology related to virtualization has evolved over time and has not yet become fully standardized, these terms do not always provide clear distinctions between the software layers and components to which they refer. For example, the term, "hypervisor" is often used to describe both a VMM and a kernel together, either as separate but cooperating components or with one or more VMMs incorporated wholly or partially into the kernel itself. However, "hypervisor" is sometimes used instead to mean some variant of a VMM alone, which interfaces with some other software layer(s) or component(s) to support the virtualization. For example, in some systems, some virtualization code is included in at least one "superior" VM or host operating system to facilitate the virtualization.

Some software components are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. FIGS. 1A and 1B show one or more virtual machine monitors that appear as separate entities from other components of the virtualization software and perform certain functions relating to the invention. Those skilled in the art may recognize that such a representation of these components is provided only for the sake of simplicity and clarity and by way of illustration. As mentioned above, the distinctions between and among the various components of a virtualization system are not always so clear-cut, and the use of the term "virtual machine monitor" or just "VMM" is meant to encompass the component(s) in the virtualization software that perform the indicated functions, regardless of what name they are given.

The various virtualized hardware components of virtual system hardware 28, such as virtual CPU(s) 21-21$m$, virtual memory 23, virtual disk 24, and virtual device(s) 27, are shown as being part of VM 20 for the sake of conceptual simplicity. In reality, these "components" are merely projections of virtual devices that are visible to guest operating system 22, but are actually usually implemented by device emulators 33 included in the VMM.

Different systems may implement virtualization to different degrees—"virtualization" generally relates to a spectrum of definitions rather than to a bright line. A particular implementation often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is configured in some way to provide certain features that facilitate virtualization. For example, the guest operating system in some para-virtualized systems is designed to avoid hard-to-virtualize operations and configurations. For example, the guest operating system may be written so that it avoids certain privileged instructions, certain memory address ranges, etc. As another example, many para-virtualized systems include an interface within the guest that enables explicit calls to other components of the virtualization software.

In addition to the sometimes fuzzy distinction between full and partial (para-) virtualization, two arrangements of intermediate system-level software layer(s) are in general use: a "non-hosted" configuration, such as that shown in FIG. 1A, and a "hosted" configuration, such as that shown in FIG. 1B. The non-hosted configuration illustrated in FIG. 1A, deploys one or more VMMs 30-30n on top virtualization kernel 60. Kernel 60 is constructed specifically to provide efficient support for VMMs 30-30n. In particular, kernel 60 includes device drivers to manage and control physical system hardware 10, and to assign and distribute resources to VMMs 30-30n. A console operating system 42 and associated applications 43 may be provided to provide a user interface to allow a user (e.g., an administrator) control over the operation of kernel 60 as well as to interact with applications executing on each of the virtual machines.

In the hosted configuration shown in FIG. 1B, VMMs 30-30n run directly on the hardware platform along with host operating system 50. In a hosted virtualized computer system, an existing, general-purpose operating system forms "host" operating system 50 that is used to perform certain input/output (I/O) operations, alongside and sometimes at the request of the VMM. In this configuration, host operating system 50 includes driver 58 and one or more executable applications 56 that serve a number of virtualization functions, including provide an interface between VMMs 30-30n and physical devices, manage and distribute system resources, and provide user interfaces to virtualization system and the inputs and outputs to each of the virtual machines. Host operating system 50, installed drivers 54, VM applications 56, along with other user applications 43 form host system software 52. The Workstation product of VMware, Inc., of Palo Alto, Calif., is an example of a hosted, virtualized computer system, which is also explained in U.S. Pat. No. 6,496,847 (Bugnion, et al., entitled "System and Method for Virtualizing Computer Systems"). Thus, the term "host" in this particular context refers to the host operating system that is used to support a virtual machine, whereas, generally speaking, it refers to the physical host platform on which the virtual machine resides.

With respect to terminology, it should be noted that kernel 60 shown in the non-hosted system in FIG. 1A is not the same as the operating system kernel within the guest operating system 22. As is well known, every operating system has its own kernel. Note also that kernel 60 is part of the "host" platform of the VM/VMM as defined above even though the configuration shown in FIG. 1A is commonly termed "non-hosted." Kernel 60 may be considered to be both part of the host platform and part of the virtualization software. The difference in terminology is one of perspective and definitions that are still evolving in the art of virtualization.

Regardless as to whether the system is configured as a hosted virtualization system or a non-hosted virtualization system, the address space of system memory 13 is generally partitioned into pages, regions, or other analogous allocation units. Applications address the memory using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address physical system memory 13. The same offset is usually used in both a VA and its corresponding PA, so that only the VPN needs to be converted into a corresponding PPN. The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by an application running in a VM is remapped twice in order to determine which page of system memory 13 is intended. The first mapping is provided by guest operating system 22, which translates the guest VPN (GVPN) into a corresponding guest PPN (GPPN) in the conventional manner. In a manner of speaking, the guest OS therefore "believes" that it is directly addressing the actual hardware memory, but in fact it is not. A memory management module, located typically somewhere in the virtualization software (such as in the VMM) performs the second mapping by taking the GPPN issued by the guest OS and mapping it to a hardware (or "machine") physical page number PPN that can be used to address physical system memory 13. This GPPN-to-PPN mapping may instead be done in the main system-level software layer, depending on the implementation. From the perspective of guest operating system 22, the GVPN and GPPN might be virtual and physical page numbers just as they would be if the guest operating system were the only operating system in the system. From the perspective of the system software, i.e., the virtualization layer, the GPPN is a page number that is then mapped into the physical memory space of the hardware memory as a PPN.

The addressable space of the disk(s), and therefore also of the virtual disk(s), is similarly subdivided into separately identifiable portions such as blocks or sectors, tracks, cylinders, etc. In general, applications do not directly address the disk; rather, disk access and organization are tasks reserved to the operating system, which follows some predefined file system structure. When the guest OS wants to write data to the (virtual) disk, the identifier used for the intended block, etc., is therefore also converted into an identifier into the address space of the physical disk. Conversion may be done within whatever system-level software layer that handles memory, disk and/or file system management for the VM and other processes.

Viruses

A "virus" is a malicious program or code that surreptitiously enters a computer environment. Viruses often replicate themselves, or cause themselves to be replicated, thereby consuming excessive amounts of computer resources, and causing degradation or disruption of computer operation. A "worm" can be defined as a virus that automatically attaches itself to outgoing email or other network messages. Some viruses are written so that they do not seriously harm the infected system. For example, a virus may be written that merely causes the message "Happy Birthday Ludwig!" to repeat on a monitor screen. Other viruses erase or corrupt disk files, or require that a hard disk be entirely reformatted. A virus may wreak its havoc immediately upon entering a computer environment, or may lie dormant until circumstances cause their code to be executed by the host computer. Regardless as to the potential damage that can be caused by a particular virus, all viruses are generally considered malicious, should be prevented from infecting a system, and should be removed if discovered. For present purposes, the term "virus" will refer to any such malicious code.

The threat of viruses is particularly acute in a networked environment, where a computer on the network is accessible to viruses of varying degrees of sophistication and severity created by legions of hackers. These viruses may surreptitiously enter the computer environment through a variety of mechanisms, for example, as attachments to emails or as downloaded files, from a CD or diskette, or through a service program listening to a well known network port, such as that for the RPC service in Windows. To guard against viruses such as these, there is a need for an anti-virus mechanism that is effective and scales easily in a virtual machine environment. There are generally two types of anti-virus software— system scanners that scan a complete disk drive and memory system for malicious code, and "on-access" scanners that scan a file when it is requested by the operating system. An on-access scanner is generally considered the more secure system since the malicious code is not able to cause damage prior to the next complete scan. With the ongoing progress of hardware processing power and the advance of SMP architectures, the number of virtual machines capable of being run on a single hardware host is increasing. With the concomitant proliferation of computer networks, the threat of viruses or worms remains a serious threat to the stability, reliability, and performance of applications and operating systems running within virtual machines.

SUMMARY

An on-access anti-virus mechanism that is optimized for use in a virtualized computer system is provided. In one embodiment, a method for protecting a plurality of guest virtual machines (VMs) from malicious code includes scanning certain data using a scan engine configured to execute within a virtualization layer outside a context of a target virtual machine (VM), and protecting the target VM using a driver portion installed in the target VM. The scanning of the data includes receiving a scan request from a driver portion of the anti-virus system the scan request identifying the data to be scanned, reading the data and comparing the data with a virus signature database, determining a result of the scanning, the result indicating whether malicious code is present in the data, and reporting the result of the scanning back to the driver portion that requested the scan. The protecting of the target VM includes intercepting an access request to a file, communicating a scan request to the scan engine, receiving the result from the scan engine, and taking remedial action when the result indicates the file contains malicious code. The scan request includes the identification of the data to be scanned by providing information identifying a location of the data to be scanned. The data to be scanned being or corresponding to contents of the file. The remedial action can include one or more of notifying a user, deleting the file, or quarantining the file.

In another embodiment, a tangible medium embodying instructions usable by a computer system to protect a plurality of guest virtual machines (VMs), which execute via virtualization software on a common host platform, from malicious code is provided. A scan engine is configured to scan data for malicious code and determine a result of the scanning, wherein the result indicates whether malicious code is present in the data. A driver portion is configured for installation in an operating system of a target VM, which is one of the guest VMs. The driver portion intercepts an access request to a file, that originates within the target VM. The driver portion communicates information identifying a location of the data to be scanned by the scan engine without sending a copy of the data to the scan engine. The scan engine executes within the virtualization layer outside a context of the target VM.

DETAILED DESCRIPTION

Figure 1A:
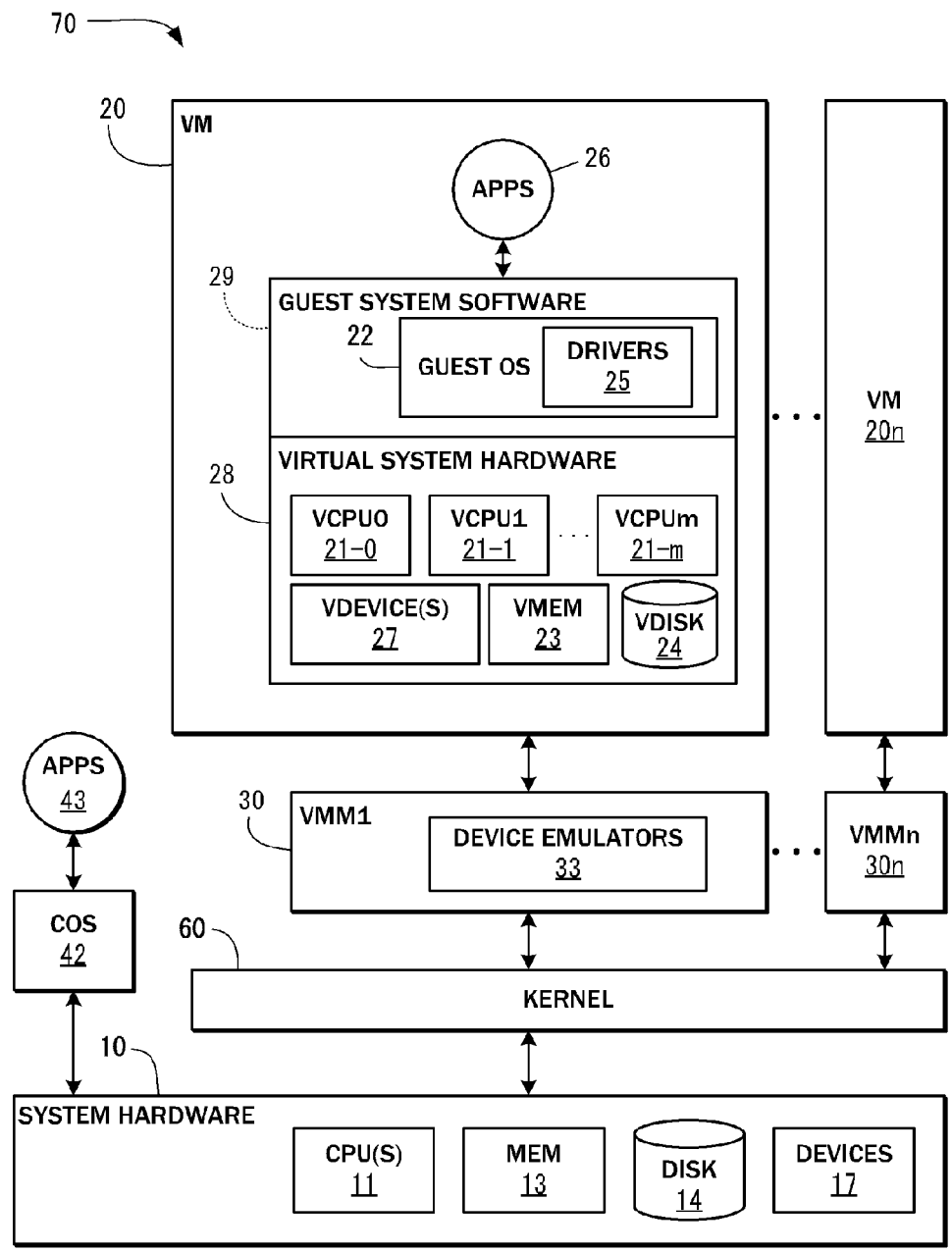
FIGS. 1A and 1B are block diagrams illustrating the components of two conventional types virtualized computer systems.

Existing antivirus solutions do not scale well with increasing numbers of guest virtual machines (VMs) on a single host platform. Consider, for example, FIG. 2, which illustrates a conventional on-access type anti-virus mechanism adapted for use in a physical computer system 200. As shown, that mechanism has two components, a kernel driver 202 and a scan engine 204, which together are configured to check for viruses in a four-step sequence. In step 1, the kernel driver 202 intercepts a file access request, e.g., open, close, write or read access, from a source 208, which may be an application or a system-level program. In step 2, kernel driver 202 invokes the scan engine 204. The scan engine 204, which includes a virus signature database 206, performs a scan to determinate if there is a virus infection of that file. More specifically, the scan engine 204 scans the file to determine whether one or more of the virus signatures in the virus signature database 206 are encountered. In step 3, the scan engine 204 reports the results of the scan, i.e., positive (file infected) or negative (file not infected), back to the kernel driver 202. In step 4, if the results of the scan are positive, the kernel driver 202 denies the file access request, and may also quarantine the infected files or delete the virus from the file. If the results of the scan are negative, the kernel driver 202 allows the request to proceed.

Figure 2:
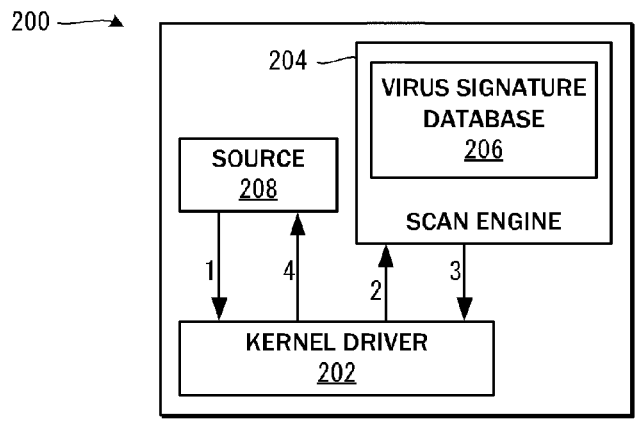
FIG. 2 is a block diagram of a conventional on-access anti-virus system.
Figure 3:
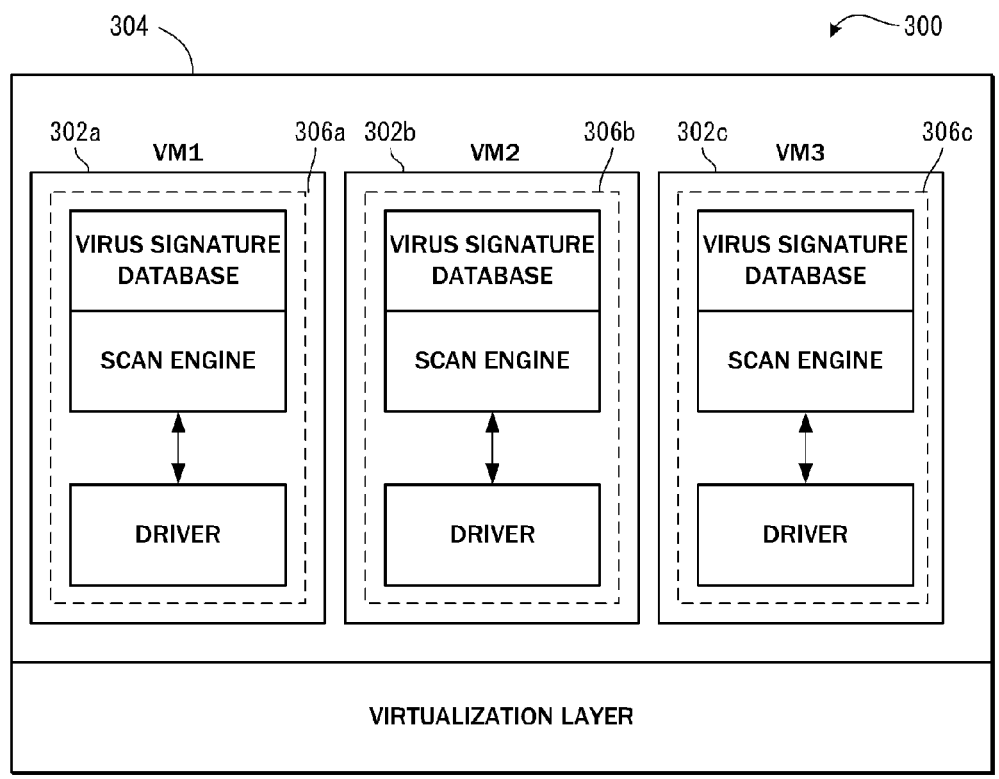
FIG. 3 is a block diagram of the conventional anti-virus system of FIG. 2 as applied to a virtualized computer environment.

To adapt this scheme to a virtual machine environment, it has been proposed that the mechanism illustrated in FIG. 2 be replicated within each of the virtual machines resident on the physical host. This situation is shown in FIG. 3, which illustrates a virtual machine system 300, comprising a plurality of virtual machines 302a-c, resident on a physical computer 304. As shown, the mechanism of FIG. 2, identified in FIG. 3 with numerals 306a-c, has been replicated within each of the virtual machines 302a-c resident on the physical computer 304.

Unfortunately, this approach is cumbersome and inefficient for at least four reasons. First, it is expensive and complicated to manage because, as new viruses are identified, updates must be made to each of the virus signature databases running inside each of the virtual machines. Second, because scan engines are running in parallel inside each of the virtual machines, and duplicate copies of the same virus signature database must be stored in memory, the memory "footprint" presented by each virtual memory, and the memory overhead consumed by each virtual machine, increases. As a result, memory requirements multiply with the number of VMs and bottlenecks due to contention for physical memory at the host are increased. Third, the scheme presents a risk that the anti-virus software executing inside a guest virtual machine may be disabled by a virus or infected file that also resides within the same guest virtual machine. Fourth, the system does not scale well with an increase in virtual machines, as each addition of a virtual machine requires adding a entirely new anti-virus mechanism to the system.

Figure 4:
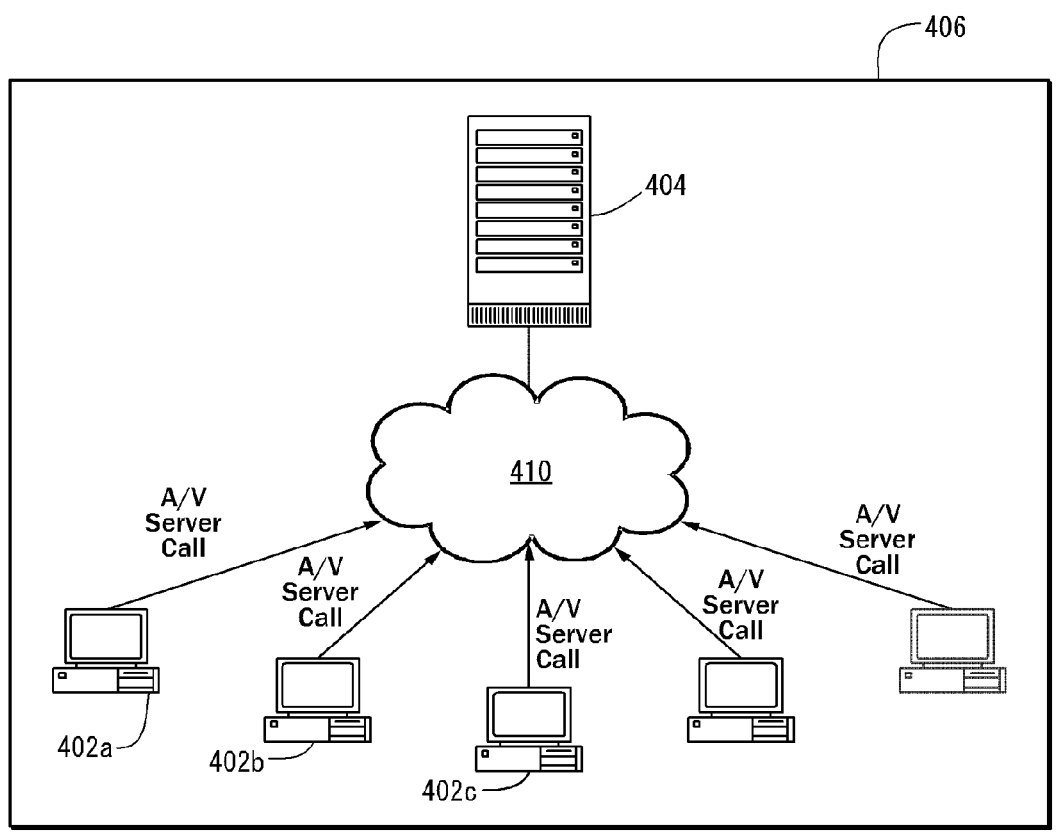
FIG. 4 is a simplified diagram of a client-server based anti-virus system in a virtualized computer environment.

A client server scheme, illustrated in FIG. 4, has also been proposed for use in a virtual computer system 400 for the purpose of combating viruses. This configuration is described in "Performance Implications of Anti-Virus Execution on a Virtual Platform," slide presentation, Derek Uluski et al., Jan. 11, 2006, Cambridge, Mass. In this scheme, a virtual computer system 400 has a server VM 404 and a plurality of guest VMs 402a, 402b, etc. Server VM 400 and guest VMs 402 are in communication with each other over a virtual network 410, which is implemented entirely in software by the virtualization layer of virtualized system 406. An anti-virus mechanism is resident on server VM 404, where it may be invoked by "client" guest VMs 402a, 402b, etc., in response to anti-virus (A/V) server calls. These A/V server calls in turn are spawned whenever a file access request is attempted by a client machine or whenever data is attempted to be sent between a client machine and the host. In response to an A/V server call, the server requests the file, and the client machine communicates the content of the file to the server. The server scans the file, and compares it against a virus signature database. If the server detects a virus, it interrupts the client virtual machine, which in turn alerts the end user.

While the client-server scheme requires that updates be made to only a single virus signature database, it suffers from additional problems. For instance, while the A/V server calls are being processed, the file accesses in the client machines are allowed to proceed. As a result, if the file is infected, an access to the file may spread the virus throughout the virtual machine, putting the entire VM at risk. The problem is compounded because of the delay between the time an A/V server call is made, and the time the server detects a virus and notifies the client machine. This delay can be significant, particularly with large files, which take longer to send to server VM 404 and then scan. The larger the delay, the greater the risk that the virus will spread and proliferate throughout the client machine.

One embodiment of a virtualized computer system 500 addressing the deficiencies of the prior art noted above is illustrated in FIG. 5. In this embodiment, a plurality of guest virtual machines (VMs) 502a-c reside on a physical host platform 504. Although three guest VMs 502a-c are shown, it should be understood that any number of guest VMs can be provided. The physical host platform 504 also includes a virtualization layer 514. Virtualization layer 514 comprises a layer of executable code in the virtualized computer system 500 for managing guest VMs 502a-c and for providing an interface between guest VMs 502a-c and one or more physical resources of the host platform 504 as described above with reference to FIGS. 1A and 1B. In a hosted virtualization system such as that described above with reference to FIG. 1B, the virtualization layer 514 includes at least a virtual machine monitor (VMM) for each guest virtual machine and the host operating system, drivers, and applications, as described in the Background section above. In a non-hosted virtualization system such as that described above with reference to FIG. 1A, the virtualization layer includes at least a VMM for each guest VM and a virtualization kernel. As previously described, it is also possible for the console operating system 42 (FIG. 1A) to include virtualization components such as user interface elements. Furthermore, some components of virtualization layer 514 may reside in hardware.

An anti-virus system is provided to protect each VM 502a-c from malicious software such as viruses. The anti-virus system includes a driver portion 506a-c for each guest VM, a scanning portion 508, and a communication portion 518. Each driver portion 506a-c resides in a corresponding one of each guest VM 502a-c. Scanning portion 508 resides in virtualization layer 514, outside contexts of the guest VMs. Communication portion 518 provides two-way communication between driver portions 506a-c and scanning portion 508. This communication can take a variety of forms, including, for example, pairwise communication, i.e., communication that occurs between the scanning portion 508 and one of the driver portions 506a-c at a time, or broadcast or multicast communication, i.e., communication that occurs between the scanning portion 508 and one or more of the driver portions 506a-c at a time. Existing communication mechanisms known in the field of virtualization software can be utilized.

In one embodiment, driver portions 506a-c may be part of or include software agent processes executing within each of the guest VMs 502a-c. The software agent may be configured to perform a variety of tasks on behalf of the corresponding guest VM. For example, the software agent may be responsible for managing communications between the corresponding guest VM and the virtualization layer 514. Driver portion 506a-c may be a kernel driver or module of the guest operating system running in each of the guest VMs 502a-c. In an exemplary embodiment, driver portion 506a-c may be configured to intercept file access requests that originate from a source 516a-c within the corresponding one of guest VMs 502a-c. As described above with reference to FIGS. 1A and 1B, the virtual disk for each guest VM may be mapped to a physical location on a physical disk of or accessible by the host platform. The physical disk may, of course, be any non-volatile mass data storage device. The file access requests may include open, close, write, or read requests. When such a file access request is intercepted, driver portion 506a-c causes information regarding the requested file to be communicated to the scanning portion 508 over the communication portion

518. Information regarding the requested file includes information sufficient to enable the scanning portion to scan the file to determine whether the infected file contains malicious software, and may include the contents or location of the requested file. The location of the requested file can include either an identifier or address of the file, wherein the address specifically identifies virtual disk blocks or portions of guest memory containing the file content. In one embodiment, driver portion 502a-c communicates the information regarding the requested file directly. In another embodiment, driver portion 502a-c causes the information to be communicated by triggering an agent or other program resident in the corresponding VM to perform the communication. Source 516a-c may be an application program executing in the corresponding guest VM 502a-c at the user level, but may also be a program or utility executing at the VM's system level, i.e., within or by the guest operating system.

In one embodiment, driver portion 506a-c may be configured to suspend the file access request until scanning portion 508 reports back the results of the scan. In this embodiment, any virus infecting the file is not allowed to proliferate in the virtual machine while scanning portion 508 is scanning the file contents. If scanning portion 508 reports back that the file is infected, driver portion 506a-c may block the file access request and take some other remedial action, such as alerting the end user of the presence of a virus in the requested file and/or quarantining or deleting the requested file. If scanning portion 508 reports back that the file is clean, i.e., devoid of malicious software, then the driver portion 506a-c allows the file access request to proceed. In one embodiment, the intercepting and suspending of file access requests and the scanning of requested files are performed transparently to the end user, who may be informed of the result of the scanning only when an infected file is detected.

Figure 1B:
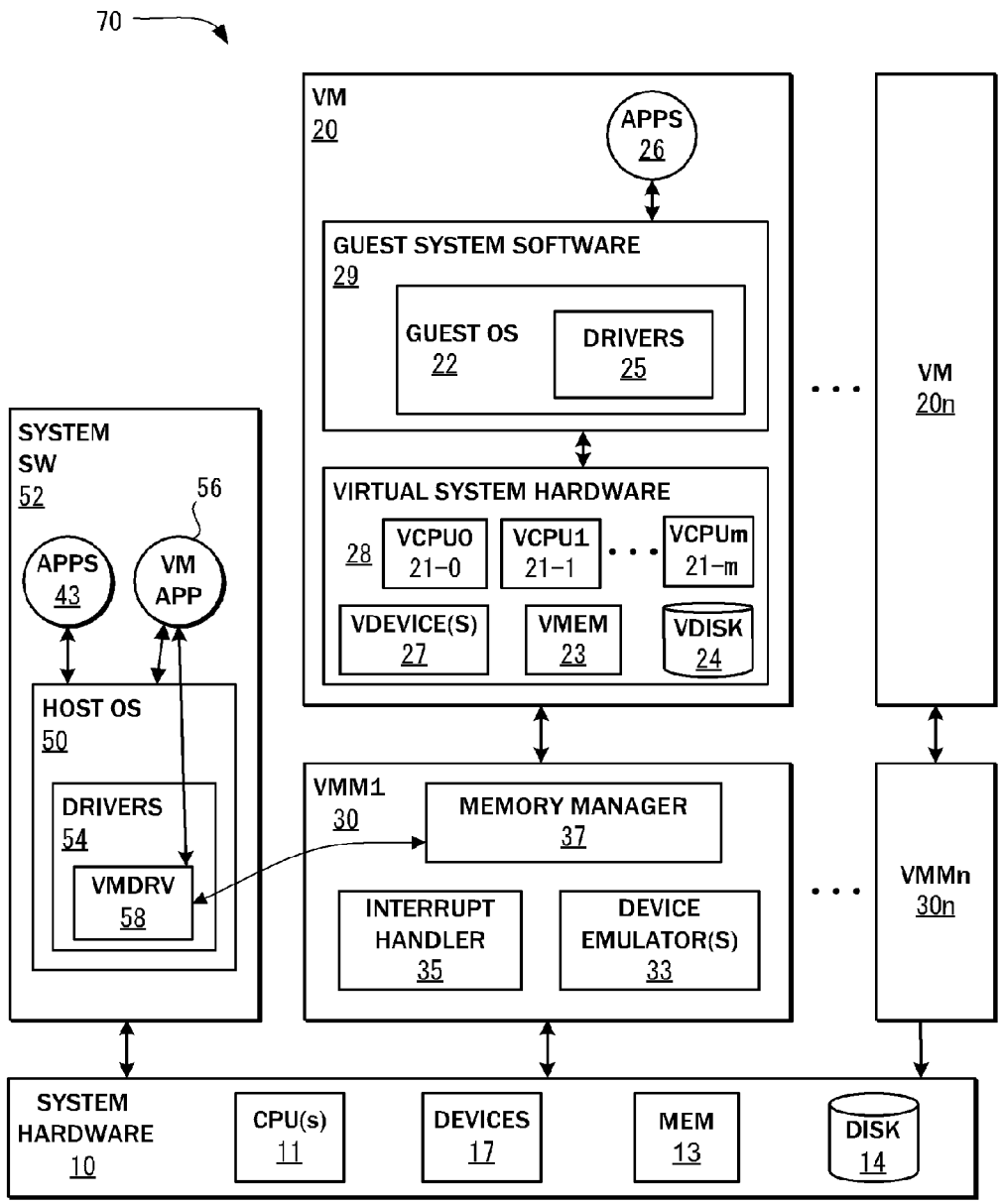

The scanning portion 508 comprises a scan engine 510 and a virus signature database 512. Scan engine 510 is a body of executable code, stored, for example, on a tangible computer readable medium and/or executing on a processor, which is configured to scan the content of a selected file, typically as binary data stored on a memory, for example, hard disk or RAM memory, and compare it with virus "signatures" in the virus signature database 512. A virus "signature" is a unique string of bits, or the binary pattern, of all or a portion of a virus. It is analogous to a fingerprint in that it can be used to detect and identify specific viruses. Virus signature database 512 is a collection of such signatures. In the embodiment illustrated in FIG. 5, scanning portion 508 resides within virtualization layer 514. For a non-hosted system such as that depicted in FIG. 1A, scan engine 510 may written for execution within or attached to VM kernel 60 (FIG. 1B). For example, scan engine 510 may be provided as component that runs directly on virtualization kernel 60. It is also possible for scan engine 510 to be implemented and installed as a driver component of kernel 60, or execute within console operating system 42. In the case of a hosted virtualization system, where the virtualization layer 514 includes all or part of the host operating system, scan engine 510 may reside within the host operating system.

Scan engine 510 receives the contents or the location of the requested file from driver portions 506a-c and compares the contents of the requested file with the virus signatures in virus signature database 512 to determine whether the file contains malicious code in a manner well known in the art of anti-virus software. Virus signature database 512 may reside on a system disk or otherwise be accessible to scan engine 510. After completing the comparison, scanning portion 514 reports its results, i.e., whether the file contains malicious code or not, back to the driver portion 506a-c that intercepted the file request.

The communications portion 518 is a means for allowing or enabling two-way communication between each of the driver portions 506a-c, and the scanning portion 508. As mentioned above, the contents of the communication may include file content or file location, and the communication may be provided directly from driver portion 506a-c, or via an intermediary such as a software agent to the scanning portion 508. Communication portion 518 also allows communication of scanning results, i.e., whether or not a file contains malicious code, from scanning portion 508 to the driver portion 506a-c. Furthermore, a particular communication may be pairwise communication, i.e., communication between only one of the driver portions 506a-c and the scanning portion 508, or it may be multicast or broadcast communication, i.e., parallel or concurrent communication between a plurality of driver portions 506a-c and the scanning portion 508. In one embodiment, the communication portion 518 includes a communication link or utility allowing communication between a software agent executing in each of the virtual machines 502a-c, which software agent includes the driver portion 506a, 506b, 506c, and the virtualization layer 514 or the host operating system included in the virtualization layer 514.

In one embodiment, the software agent may be provided in a package of tools running in each virtual machine known as VMware Tools that is provided with VMware's "ESX Server" and "Workstation" products, and the communication link between this agent and the virtualization layer 514 is a reliable communication channel known as a "hypervisor call" or just "hypercall." A hypercall is a special function that allows select software modules, such as drivers 506a-c, to communicate with the virtualization layer 514 through a bridge component (not shown) which may itelf be implemented in virtualization layer 514. For example, driver 506a may place information into one or more registers or into a specified memory location and then execute an instruction that causes a hardware fault, such as an IN or OUT instruction in the current x86 platform, or an instruction such as VMCALL from the new "Intel VT" or "AMD-V" virtualization extensions from Intel Corporation and AMD, respectively. Virtualization layer 514 then responds to the hardware fault, obtains the information passed by driver 506a and reacts accordingly. For example, the virtualization layer 514 may switch the hardware context to allow scanning portion 508 to execute, and the virtualization layer 514 may pass information received from driver 506a to scanning portion 508, using the bridge.

Figure 5:
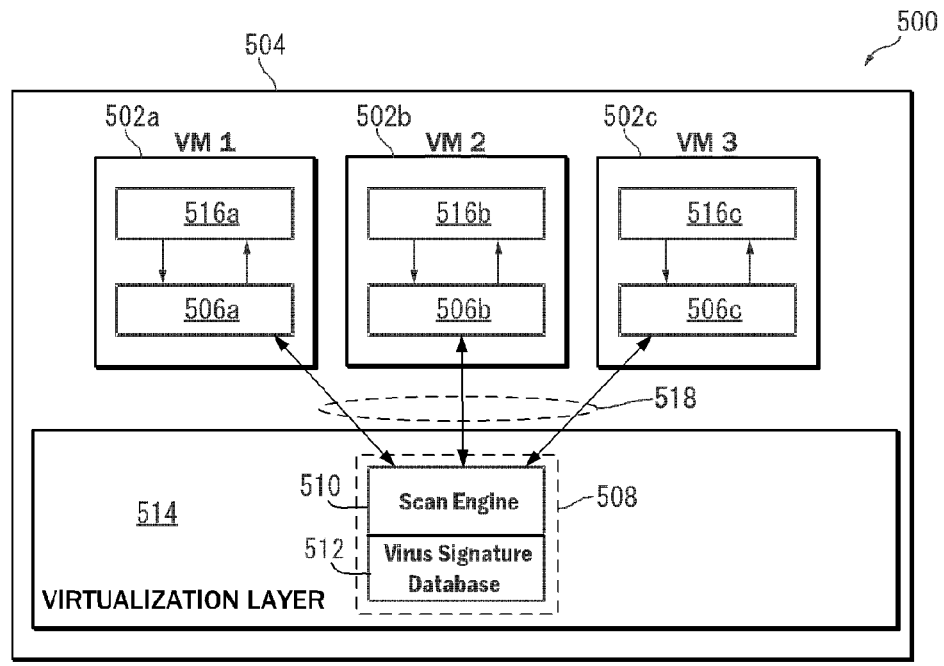
FIG. 5 is a block diagram of an exemplary anti-virus system.

The anti-virus system described above with reference to FIG. 5 simplifies virus signature updates that occur. For example, when a new virus is identified, rather than having to update multiple instances of this database, as required in the approach described above with reference to FIG. 3, only a single virus database need be updated. In addition, the present embodiment described with reference to FIG. 5 reduces overhead and contention for memory because only one scan engine and signature database are needed per host whereas, in FIG. 3, each VM requires a scan engine and signature database. Because the scanning portion 508 is not visible to applications programs running in the guest VMs at the user level, the scanning portion is protected from these applications as well as the guest kernel running in the VM. Therefore, malicious code running in the guest VM is unable to disrupt or disable the scan engine or the signature database. The system described here with reference to FIG. 5 can support multiple scanners operating in parallel, which may be provided by different vendors that specialize in removing different forms of viruses. This feature increases the chances of detecting viruses sooner than in the past. Because file accesses in the guest VMs 502a-c are suspended while the scanning occurs, the anti-virus system described with reference to FIG. 5 is less vulnerable to virus proliferation than the previous system described above with reference to FIG. 4.

Figure 6:
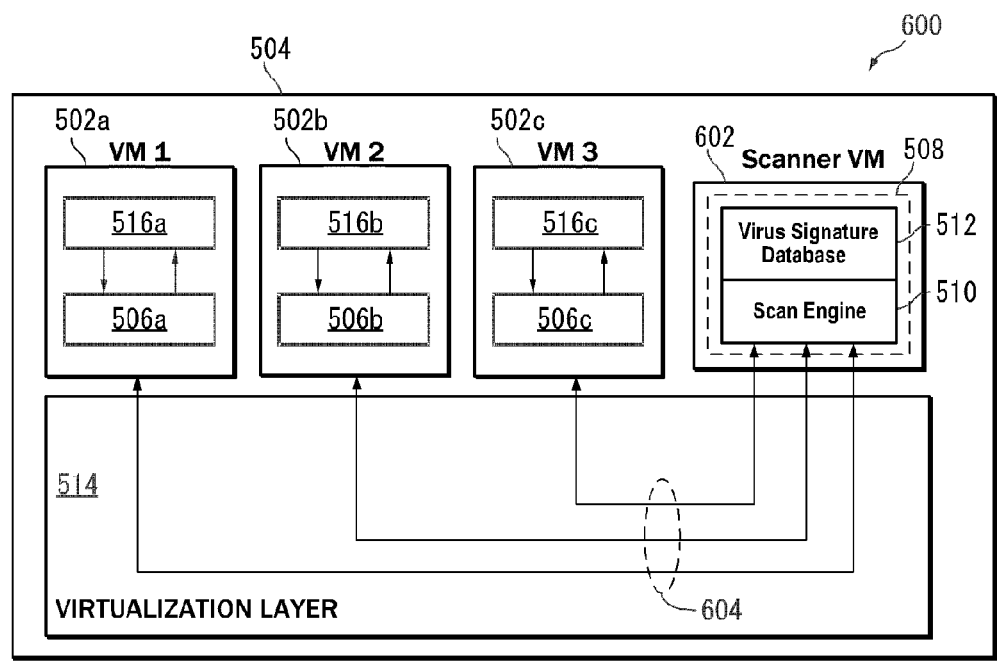
FIG. 6 is a block diagram of another exemplary anti-virus system.

Referring to FIG. 6, a second embodiment of a virtualized computer system 600 is illustrated. In this figure, elements in common with the embodiment of FIG. 5 are referenced with like identifying numerals, and, for purposes of clarity, are not separately described here. Rather, the reader is referred to the description of the embodiment of FIG. 5 for a description of these elements. Here, the focus of the discussion will be on the differences between this embodiment and that illustrated in FIG. 5.

In this embodiment, an anti-virus system, comprising driver portion 506a-c resides in each of the guest VMs 502a-c, whereas scanning portion 508 resides within a scanning VM 602, which may be a dedicated virtual machine. By "dedicated," it is meant that the only substantial function of scanning VM 602 is to provide anti-virus scanning. In this or other embodiments, scanning VM 602 may be streamlined, i.e., have limited functionality, when compared with the other guest VMs 502a-c. Similar to the communications portion 518 in FIG. 5, here communications portion 604 provides or enables communication between each driver portion 506a-c, and the scanning portion 508. Unlike communications portion 518 in FIG. 5, the communications portion 604 extends through, but does not terminate at, the virtualization layer 514 or the host operating system. Otherwise, the communications portion 604 performs the same function as communications portion 518. In one embodiment, communication portion 604 provides an intermediary component (not shown) that receives and retransmits messages from driver portions 506a-c and scanning portion 508.

Although the embodiment presented in FIG. 6 requires additional processing overhead caused by performing anti-virus scanning within a VM and by providing communication between the target and scanning VMs instead of just a single VM as in the previous embodiment described above with reference to FIG. 5, the embodiment shown in FIG. 6 provides enhanced protection against vulnerabilities in third-party virus scanners and malicious software. This is because scanning portion 508 is isolated in scanning VM 602 and therefore allows remaining VMs to continue to operate in the event that scanning VM 602 fails, e.g., as a result of a malicious exploit, and is forced to restart. On the other hand, if the scanning portion 508 is provided within virtualization layer 514 as shown in FIG. 5, then there is a small risk that the entire system can crash as a result of a malicious exploit against the anti-virus system.

Figure 7:
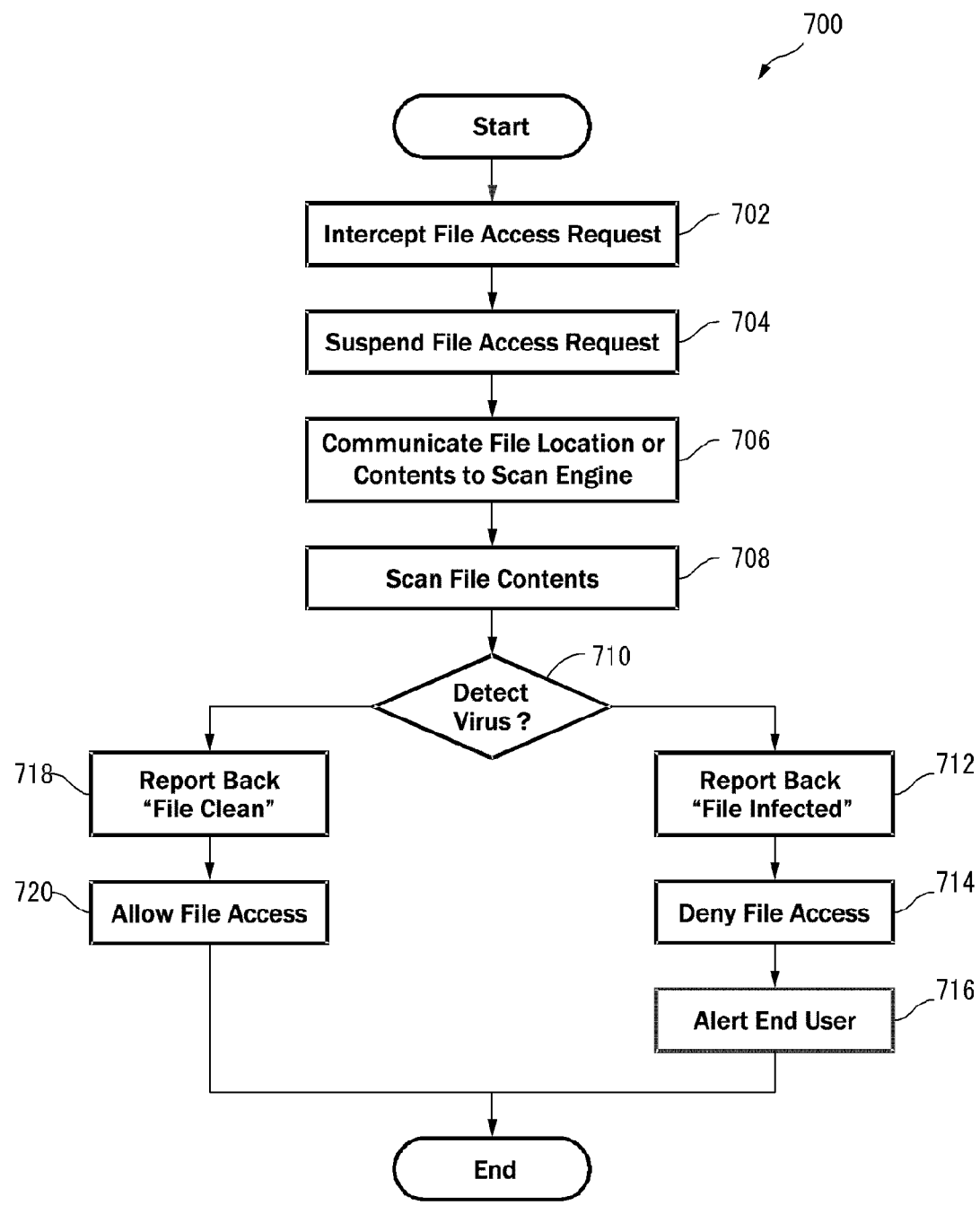
FIG. 7 is a flowchart of an exemplary method of providing anti-virus protection to each of a plurality of guest virtual machines in a virtualized computer system.

FIG. 7 shows a flowchart 700 of an exemplary procedure for protecting each of the virtual machines in a virtualized computer system from viruses. In one embodiment, the procedure is initiated when a file access request is made in one of guest VMs 502a-c in the virtualized computer system. As mentioned earlier, the file access request may originate within an application program executing at the user level in guest VM 502a, 502b, or 502c or within the guest operating system executing at the system level in one of the guest VMs 502a-c.

In operation 702, the file access request is intercepted by one of driver portions 506a-c. In operation 704, the file access request is suspended pending the scanning of the file for viruses. In one embodiment, this step is performed by the one of driver portions 502a-c that corresponds to the guest VM in which the file access request is intercepted.

In operation 706, the location or contents of the requested file is communicated to scan engine 510. In the embodiment of FIG. 5, this communication is provided or enabled by the communication portion 518. In the embodiment of FIG. 6, it is provided or enabled by the communication portion 604. A variety of specific approaches for performing operation 706 are possible. Three such examples will be described now, although it should be understood that many more examples are possible, and these three examples are not intended to be limiting in any way.

In a first approach, referred to hereinafter as "the disk block approach," the driver portion, or software agent including the driver portion, of the "target" VM, i.e., the virtual machine where the request originated, queries the guest operating system for the virtual disk blocks containing the file content. As discussed earlier, each virtual machine has a virtual disk that is mapped to a physical disk on the host. For example, the disk blocks, which are physical from the stand point of the virtual machine are mapped by the virtualization layer to disk blocks of a file maintained by the virtualization layer on the host's disk. In one embodiment, the addresses of the disk blocks are retrieved using an application programming interface (API) provided by the guest operating system, for example, the de-fragmentation API in Windows.

In the case of the embodiment of FIG. 5, the software agent in the target VM communicates the location of those disk blocks (e.g., the disk block address or identifier) on behalf of driver portion 506a-c over the communications portion 518 to the scanning portion 508, or the virtualization layer 514. In turn, the scanning portion 508 or virtualization layer 514 on behalf of scanning portion 508, has those disk blocks mapped as a file object, which may be disk blocks or a portion of memory that is accessible to the scanning portion 508. The file object is then passed or identified to the scan engine 510 for scanning. In one embodiment, the virtualization layer translates the virtual disk block numbers into offsets in a file that represents the guest VM's virtual disk drive. The file may include an image of the VM's virtual disk maintained by the virtualization layer. The scanning portion would then invoke an API provided by a component of the virtualization layer (e.g., the host operating system or VM kernel) to access the block contents.

In the case of the embodiment of FIG. 6, the virtualization layer receives the disk block numbers from the target VM and identifies the file offsets as described above. The virtualization layer then passes these file offsets to the scanning VM. Within the scanning VM, a special device is provided to access the disk image file of the target VM. To scan a block within the disk image, the scanning VM simply accesses the file block at the given offset.

While this approach is relatively efficient, it will not work when the disk blocks are encrypted or compressed using an algorithm that is proprietary to the guest operating system, or when the disk blocks identifiers are not an up-to-date or consistent representation of the file because, for example, the file system has cached the file content to RAM memory and has lazily flushed a portion of this content to disk. An example of a file system where this possibility is present is NTFS from Microsoft.

In a second approach, referred to hereinafter as the "network file approach," it is assumed that the requested file resides within a network file system, i.e., a file system that is shared at least between the target guest virtual machine and the host platform. Those skilled in the art of virtualization will note that it is common for a virtual network be implemented that places each of the guest VMs in communication with one another over virtual network interfaces.

A network path name is a path name that specifically identifies the file across a network. One example of a network path name is one that follows the Uniform (or Universal) Naming Convention, known as UNC. Such a network path name has meaning to the scan engine 510, which resides outside of the target VM. The computer and volume names can be used to specify a globally unique name that specifically identifies a file across the network. In the second approach, the driver portion or the software agent, operating on behalf of the driver, obtains the network path name that corresponds to the file being accessed.

For example, the driver portion or agent may generate the network path directly using known information such as the syntax of the network path convention being followed, and known information such as the computer and volume names. Alternatively, the driver portion or agent may communicate the local (i.e., known) path name for the requested file to the guest operating system, which translates that into a network path name. Thus, the network path may be followed by the scan engine 510 in order to access the file content. For example, a path name of "C:\Windows\notepad.exe" that has meaning to a target virtual machine VM1 might be translated to "\\VM1\C\Windows\notepad.exe," a path name that has meaning to the scan engine 510. The scan engine 510 then accesses the file content using this network path name, and scans the file. This approach may be used in those cases where the first disk block approach will not work, for example, because the disk blocks are encrypted or compressed using an algorithm that is proprietary to the target VM, the disk blocks do not accurately represent the file content, or the scan engine 510 resides in a dedicated scanner VM, and the disk blocks from the target VM are not accessible to the scanner VM.

In a third approach, referred to hereinafter as a "memory-based approach," the software agent in the target VM writes a representation of the file into a portion of the guest physical memory of the target VM, has the guest operating system lock this portion of the guest physical memory, and communicates to the virtualization layer 514 an address of the portion of guest physical memory where the content is stored. The writing can include reading the contents from the virtual disk, decrypting the contents, and then writing the decrypted contents. Note that in this case, the contents written to memory may therefore not be simply a copy of the file as it exists on the disk, but rather a representation of the file contents that correspond to the actual file contents. As discussed in the background section, guest physical memory may be mapped to different physical memory locations in the host or paged out to a swap file or device by the virtualization layer 514. The virtualization layer 514 or host operating system in turn converts this portion of guest physical memory into a corresponding portion of host physical memory, and then communicates an address of the portion of host physical memory where the file content is stored to the scan engine 510. The scan engine 510 then performs the scan on the file content as stored in the host physical memory. In a hosted virtualization system, scan engine 510 may run at the user level of the host operating system. In this case, the host operating system, can remap the host's physical memory (which is shared with the virtualization layer) to virtual memory of the host, in which case the scan engine 510 can access the file contents using the mapped virtual memory of the host operating system.

In the case where the scan engine 510 is resident on a dedicated scanner VM as shown in FIG. 6, a variant of this approach may be followed. More specifically, the driver portion or agent in the target VM informs the corresponding VMM which guest physical memory pages contain the content. The VMM or other component of the virtualization layer converts the guest physical pages numbers (GPPN) to physical page numbers (PPN) of the host platform. In the scanner VM, a special guest physical memory location that is mapped before the scan to the same host physical pages backing the guest physical memory pages of the target VM. After the scan, this memory is unmapped. In one implementation, the pseudo-code for this procedure is as follows: the target VM tells the VMM (or other component in the virtualization layer) which guest physical memory pages contain the content. In the scanner VM, there is special guest physical memory, which is mapped, before the scan, to the same machine pages backing the guest physical memory pages of the target VM. After the scan, this memory is unmapped. In one implementation, the pseudo-code for this procedure is represented in Table 1:

TABLE 1

| Target VM | Virtualization Layer | Scanner VM |
|---|---|---|
| In the target VM, get a list of GPPNs that contain the file content (for example through kernel API); Send the list of GPPNs to the VMM; | | |
| | VMM receives the list of GPPNs and converts them to a list of PPNs. If a GPPN is currently swapped out, allocate new PPN and fetch the page from the swap file into memory; VMM remaps the PPNs to the special GPPNs in the scanner VM; | |
| | | Scanner VM scans the remapped memory blocks, returns result; |
| | When the scan is finished, the VMM removes the mapping to the special GPPNs | |

Turning back to FIG. 7, in operation 708, scan engine 510 scans the file contents. In one embodiment, operation 708 is performed by comparing a binary data representation of the file content with binary data representations of the virus signatures from the virus signature database 512. Of course, other approaches are possible. For example, decompressed, decoded or processed content from the file may be compared with the virus signature.

In operation 710, the scan engine determines whether any malicious code has been detected in the file content through the scanning performed in operation 708. If so, the procedure flows to operation 712. Otherwise, the procedure flows to operation 718.

In operation 712, scanning portion 508 reports back or has reported back to driver portion of the target VM that the file is infected. Then, in operation 714, the driver portion, in response to receiving the "file infected" message from scanning portion 508, denies or blocks the file access that was suspended in operation 704. In operation 716, the driver portion provides an alert to the end user that the requested file is infected. At that point, the procedure completes.

In one embodiment, after the scan engine detects a virus as a result of a scan, it informs a component of the VMM of the target VM of the result, which in turn informs the driver portion. In addition, the VMM may launch a user defined action at the VM level in addition to sending the result to the driver portion. Such VM level action may include but is not limited to creating a consistent snapshot of the VM, starting to record the operation of the VM, disconnecting the VM from the network, suspending the VM, and any combination of the foregoing. The benefit of VM level action is that such action is not dependent on software running inside the guest VM, and thus can be more reliably enforced.

In operation 718, branched to in the case when a virus has not been detected through the scanning in operation 708, the scanning portion reports back, or has reported back, to the driver portion of the target VM that the file is clean. In response, to receiving this "file clean" message, driver portion 506a-c of the target VM, in operation 720, allows the file access request that was suspended in operation 704 to resume. The method then completes.

Some optional refinements or optimizations of operation 708 are possible. In one refinement, applicable when using the disk block approach described above, a scan history of the disk blocks may be kept so that the disk files need be scanned only once, i.e., when an access to the file is first attempted. The disk files thereafter need not be rescanned in response to subsequent attempts to access the same file.

Figure 8A:
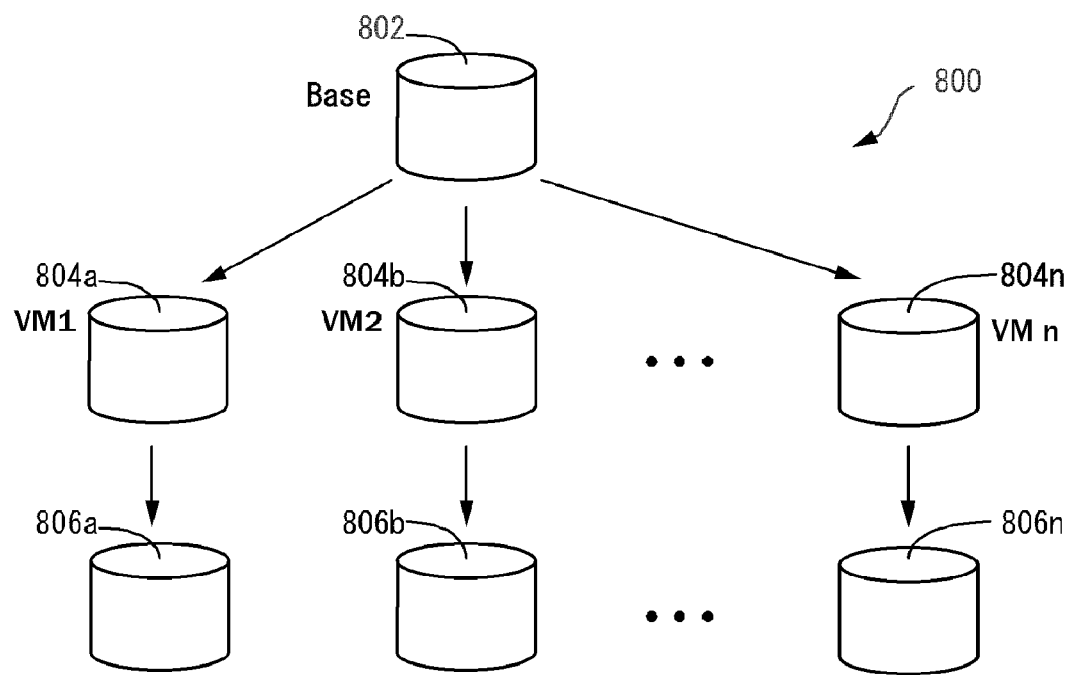
FIG. 8A is a block diagram of a subsystem for sharing disk blocks between virtual machines in a virtualized computer system, and for maintaining a scan history detailing previous scanning of the disk blocks.

FIG. 8A depicts an example of a disk block sharing subsystem 800 that allows sharing of disk blocks between virtual machines in a virtualized computer system, such as illustrated in FIGS. 5 and 6. In this system, each virtual disk comprises a base virtual disk 802 that is shared amongst all the virtual machines plus supplementary blocks 804a, 804b, and so on to 804n, each corresponding to a first virtual machine $VM_1$, a second virtual machine $VM_2$, and so forth to an nth virtual machine $VM_n$. Furthermore a redo log 806a-n, which define changes to the base plus supplementary blocks are provided for each VM. As can be seen from the foregoing, the virtual disk space for $VM_1$ comprises the blocks of the base disk 802+the blocks of disk 804a+any changes represented by the blocks of disk 806a; the virtual disk space for $VM_2$ comprises the blocks of the base disk+the blocks of disk 804b+any changes represented by the blocks of disk 806b; and the virtual disk space for $VM_n$ comprises the blocks of the base disk 802+the blocks of disk 804c+any changes represented by the blocks of disk 806c.

In this subsystem, a scan history is maintained for each of the disk blocks indicating whether or not the block was previously scanned with a negative (i.e., clean) result, and unchanged. Optionally, a time-stamp of the scan can also be maintained in the scan history as well. When the results of the scan indicate that malicious code is present, the corresponding disk blocks may be deleted or quarantined. When malicious code is present, the results of the scan, and the action taken in response to the scan, need not be stored. However, it should be appreciated that embodiments are possible where this information is also stored as part of the scan history.

Figure 8B:
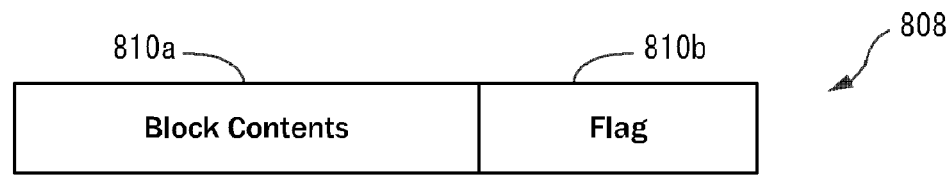
FIG. 8B is a possible format of a disk block in the subsystem of FIG. 8A.

FIG. 8B illustrates a possible implementation whereby a disk block 808 has a content portion 810a that is appended with one item of meta-data, item 810b, a one-bit flag that is normally clear but that, if set, indicates that the contents of the block have been scanned and are unmodified. In this particular implementation, as can be seen, this one-bit flag is maintained for every disk block, but it should be appreciated that other implementations are possible, where this information is stored at varying levels of granularity, e.g., for every grouping of disk blocks, rather than every block. Note also that the scan history may be maintained by any entity that has access to the shared disks, such as the guest OS in the target VM, the host OS, or the VMM. In the case of the embodiment shown in FIG. 6, the guest OS in the scanning VM may maintain the scan history.

In the subsystem of FIG. 8A, when an attempted access is made to a file, and the file is earmarked for scanning by the scanning portion 508, the scan history of the guest virtual disk blocks that contain the file content is consulted. If those scan results indicate the file content has been previously scanned, and unchanged since the last scan, the file content is not scanned again. Instead, the guest virtual machine is notified of the previous scan results, i.e., that no malicious code is present. If the scan history indicates that the file content has changed since the last scan, then the file is scanned. If the scan results for this portion are negative, i.e., no malicious code found, then, again, the guest virtual machine is notified of these scan results. After a clean scan, these blocks are flagged to indicate they have been scanned. If a block is later modified, the flag is cleared.

As an example of this, when a file in a first virtual machine VM1 is first accessed, because this is the first time the file has been accessed, it is scanned and all blocks corresponding to the file are scanned. In a second virtual machine VM2 the same file may be accessed. Since all blocks of the file are flagged as "clean," another scan may be avoided.

In another embodiment, applicable in the case where the network file or memory-based approaches for file transfer are followed, scan engine 510 maintains a scan history of the file content scanned for the guest VMs. The scan history comprises meta-data for each page (or whichever unit of memory is applicable) of scanned content, where the meta-data includes a signature of the page content.

Here, a "signature" for a file is the result of one or more operations performed on information (usually, but not necessarily limited to, the contents) of the file intended to uniquely identify the file. In general, the signature should be able to represent the file using fewer bytes (or bits, etc.) than are needed for the contents of the file itself, since otherwise it would be easier simply to use the file's contents directly as its own "identifier." Thus, for a 4 k-byte file, the signature should preferably consist of fewer than 4k bytes. In other words, the signature represents a reduced-dimensionality mapping.

Many different types (or combinations) of signatures may be used to identify memory pages within an acceptable degree of ambiguity. The chosen signature is a design choice within the skill of programmers who understand memory management techniques. A by no means exhaustive list of examples of possible signatures includes any type of checksum and any of the many types of hashing algorithms. Meta data can also be used to generate a signature. For example, a value, e.g., a hash value, computed from file block addresses can be generated. In this case, so long as the addresses of file blocks on the disk remain unchanged, then the system will assume that the file is unchanged, without having to read the entire file content to generate the signature.

In one embodiment, scan engine 510 maintains a hash table or a list of hash values. Each entry in the list or table corresponds to content of a file or a page of a file content that is identified as being free of malicious code. With the second approach, the scan engine is provided with a network path to the file to be scanned. In this case, the scan engine can maintain a signature corresponding to each file that it has scanned. When it is asked to scan the file again, it can first generate a new signature value and compare the new signature with the stored copy. If the new signature matches the stored signature, then the scan engine can assume the file has not been modified since the most recent successful scan, and can immediately report back that the file is free of malicious code.

However, if the third approach is used, the scan engine is provided with a location of a copy of the file in memory, and may not be aware of the location of the file. In this case, the scan engine maintains a list of "valid" signatures, each corresponding to a clean (i.e., having no malicious code) file. When the scan engine receives a request for a new scan, it first accesses the file in the indicated memory location and generates a new signature. The scan engine then compares the new signature with previously generated signatures in the list of signatures. If a match is found, then the scan engine assumes that the file contents are identical to the file contents of a previously scanned file that was found to be free of malicious code, and the scan engine immediately reports back that the present file is clean. This approach is more risky, however, using sufficiently long signatures, e.g., 20-byte or 160-bit signatures, can reduce the risk to an acceptable level. Furthermore, the memory allocated to the list of signatures may be limited to ensure the list does not grow ad infinitum. Finally, in many cases the list may be flushed or deleted when certain events happen, e.g., the virus database, which contains virus signatures to identify infected files, is updated.

In each case, if the computed hash value does not match the entry in the table or list of signatures then the file is rescanned, and if the scan returns a negative result indicating the file is free of malicious code, then the hash values previously computed are entered into the table or list of signatures. Of course, if the scan returns a positive result indicating that the file contains malicious code, then the driver portion is notified and corrective action is taken, e.g., deleting or quarantining the file.

This alternative implementation introduces some risk of false negatives, i.e., declaring a page as free from viruses when in fact it is infected. A false negative can occur when data signatures such as hash values are used since two different contents can be mapped to the same data signature, e.g., a clean file, and an infected file. In the case of two different pages having the same hash, one infected, the other clean, a false negative can arise if, for example, scan engine 510 scans the clean page, and, as a result of this, enters the hash value of the clean page to the hash table. Later, assuming an incoming file is received containing the infected page, because the pages have the same hash, the scan engine 510 will detect that a hash of the infected page matches the entry in the hash table, and thus assume that the page is clean when it is not. Because of this risk of false negatives, it may not always be possible to apply this alternative implementation. On the other hand, the use of large hash values, e.g., having 20 bits or more, can reduce this risk to practically zero, and this approach can greatly reduce the burden of repeated scanning.

Furthermore, in the virtual machine environment described, where the scan engine and hash database are centralized, the use of file signatures yields efficiencies that are not achievable in a traditional computer environment. For example, if a file is shared by a plurality of guest VMs executing on the same host, a likely scenario if the guest VMs are running the same guest operating system, then this file needs to be scanned only once for each of the virtual machines. This is especially fruitful when the virtualization system maps two virtual disks for separate VMs running the same operating system to a common physical disk so that identical system files are mapped to the same physical disk blocks to save disk space. After one VM accesses a system file and causes that file to be scanned for malicious code, subsequent accesses by other VMs will not require repeated scanning. An approach where file content hashing is performed independently by each of the virtual machines would require scanning this file multiple times, once by each of the virtual machines.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protecting a plurality of guest virtual machines (VMs) from malicious code using an anti-virus system comprising a scan engine and a driver portion, the plurality of guest VMs executing via virtualization layer on a common host platform, method comprising:
scanning data using the scan engine of the anti-virus system, the scan engine being configured to execute within a scanning VM executing on the host platform and logically isolated from a target VM, the target VM being one of the guest VMs, the scanning comprising:
receiving a scan request from the driver portion of the anti-virus system, the scan request identifying the data to be scanned;
reading the data and comparing the data with a virus signature database;
determining a result of the scanning, the result indicating whether malicious code is present in the data; and
reporting the result of the scanning back to the driver portion that generated the scan request; and
protecting the target VM using the driver portion of the anti-virus system, the driver portion being configured for installation in an operating system of the target VM, the protecting comprising:
intercepting an access request to a file, wherein the access request originates within the target VM;
communicating the scan request to the scan engine, the scan request including the identification of the data to be scanned by providing information identifying a location of the data to be scanned, the data to be scanned being or corresponding to contents of the file;
receiving the result from the scan engine, and
taking remedial action when the result indicates the file contains malicious code.

2. The method of claim 1, wherein the data to be scanned comprises a decrypted copy of the contents of the file.

3. The method of claim 1, wherein the data to be scanned comprises the contents of the file as they exist on a mass storage device.

4. The method of claim 1, wherein the information identifying the location of the data to be scanned comprises identification of at least one guest virtual disk block, the guest virtual disk blocks containing the file on a virtual disk that is accessible by the target VM, wherein the scanning further comprises:
obtaining identifications of physical disk blocks that are mapped to the guest virtual disk blocks, the physical disk blocks being disk blocks of a physical disk accessible to the host platform; and the reading of the data comprises accessing and reading the physical disk blocks.

5. The method of claim 4, wherein the identifications of the physical disk blocks comprise offsets into a file containing an image of the virtual disk that is accessible by the target VM.

6. The method of claim 1, wherein the information identifying the location of the data to be scanned comprises a network path to the file as it resides on a mass storage device, the network path specifically identifying the file across a network, and the scanning comprises accessing the file using the network path, the reading of the data comprising accessing and reading the file from the mass data storage device.

7. The method of claim 1, wherein:
the protecting further comprises copying the data to be scanned to guest virtual memory at locations identified by one or more guest page numbers (GPNs);
the information identifying the location of the data to be scanned comprises the GPNs; and
the scanning further comprises obtaining physical page numbers (PPNs) of physical pages of system memory corresponding to the GPNs obtained from the driver portion.

8. The method of claim 1, wherein the scan engine is configured to execute within a scanning VM, the scanning VM executing on the common host platform via the virtualization layer, the scan request being received by the scanning VM by way of the virtualization layer or a host operating system.

9. The method of claim 8, wherein the scanning VM is a dedicated VM that has a single substantial function of providing anti-virus scanning function.

10. The method of claim 1, wherein the scan engine resides in the virtualization layer.

11. The method of claim 1, wherein the remedial action comprises one or more of notifying a user, deleting a file, or quarantining the file.

12. A machine readable storage medium non-transiently storing instructions usable by a computer system to protect a plurality of guest virtual machines (VMs) from malicious code using an anti-virus system, the plurality of guest VMs executing via a virtualization layer on a common host platform, the instructions causing the computer system to implement:
a scan engine configured to scan data for malicious code and determine a result of the scanning, the result indicating whether malicious code is present in the data;
a driver portion configured for installation in an operating system of a target VM, the target VM being one of the guest VMs, the driver portion intercepting an access request to a file, wherein the access request originates within the target VM, the driver portion further communicating information identifying a location of the data to be scanned by the scan engine without sending a copy of the data to the scan engine, the data to be scanned being or corresponding to contents of the file, the driver portion furthermore receiving the result of the scan communicated by the scan engine; and
a communication portion configured to facilitate communication between the scan engine and the driver portion;
wherein the scan engine is configured to execute on the host platform logically isolated from the target VM, the communication portion facilitates the communicating of the information and the result between the driver portion and the scan engine, and at least one of the driver portion or the scan engine causes a remedial action to be carried out when the result indicates that malicious code is present in the data.

13. The machine readable storage medium of claim 12, wherein the scan engine is configured to execute in the virtualization layer.

14. The machine readable storage medium of claim 12, wherein the scan engine is configured to execute within a scanning VM, the scanning VM executing on the host platform via the virtualization layer, the scan request being received by the scanning VM via the virtualization layer.

15. The machine readable storage medium of claim 12, wherein the virtualization layer includes a host operating system executing directly on the physical host platform, the scan engine being configured as a user-level application executing in conjunction with the host operating system.

16. The machine readable storage medium of claim 12, wherein the driver is configured to communicate the information identifying the data indirectly via an agent program that executes within the context of the target VM.

17. The machine readable storage medium of claim 12, wherein the remedial action comprises notifying a component of the virtualization layer to carry out VM-level action, the VM-level action comprising one or more of creating a snapshot of the guest VM, starting a recording that traces execution of the guest VM, disconnecting the guest VM from the network, and suspending the guest VM.

18. The machine readable storage medium of claim 12, wherein the remedial action comprises wherein the remedial action comprises one or more of notifying a user, deleting a file, or quarantining the file.

19. The machine readable storage medium of claim 12, wherein the scan engine compares the data being scanned with a virus signature database to determine whether the data being scanned contains the malicious code.

20. The machine readable storage medium of claim 12, wherein the identification of the location of the file comprises identification of at least one guest virtual disk block, the guest virtual disk blocks containing the file on a virtual disk that is accessible by the target VM, wherein the scan engine obtains identifications of physical disk blocks that are mapped to the guest virtual disk blocks, the physical disk blocks being disk blocks of a physical disk accessible to the host platform.

21. The machine readable storage medium of claim 20, wherein the identifications of the physical disk blocks comprise offsets into a file containing an image of the virtual disk that is accessible by the target VM.

22. The machine readable storage medium of claim 21, wherein the scan engine, upon receiving from the driver portion the information identifying a location of the data to be scanned, consults a scan history of the physical disk blocks that contain the file, the scan engine performing the scan only when the scan history indicates that the file has been modified since the last scan or that the file has not been previously scanned.

23. The machine readable storage medium of claim 22, wherein the scan engine returns a negative result that indicates that no malicious code is present without performing a new scan when the scan history indicate the file has been previously scanned, found to be free of malicious code, and has not been modified since the last scan.

24. The machine readable storage medium of claim 22, wherein each physical disk block includes a flag to indicate the scan history of that block, wherein the flag has one value indicating the physical disk block has not been previously scanned or has been modified since the last scan and a different value indicating that the physical disk block has been scanned, found to contain no malicious code, and has not been modified since the last scan.

25. The machine readable storage medium of claim 22, wherein the guest OS maintains the scan history by setting and clearing the flag.

26. The machine readable storage medium of claim 22, wherein the file is accessible to each of the plurality of guest VMs, and each of the plurality of guest VMs includes a corresponding driver portion for intercepting file accesses within a corresponding one of the VMs, wherein the scan engine returns the negative result without performing a new scan when the scan history indicates the file has been previously scanned, the previous scan found the file to be free of malicious code, and has not been modified since the previous scan regardless as to which driver portion previously requested the last scan.

27. The machine readable storage medium of claim 12, wherein the identification of the location of the file comprises a network path to the file, the network path specifically identifying the file across a network.

28. The machine readable storage medium of claim 27, wherein the scan engine maintains a scan history of the file content, the scan history identifying files that have been successfully scanned and remain unmodified since a most recent successful scan.

29. The machine readable storage medium of claim 28, wherein the scan history includes a signature corresponding to each successfully scanned file, the signature being a value that is a function of the content of the file, wherein the scan engine, upon receiving from the driver portion the information identifying the location of the data to be scanned, consults the scan history, the scan engine performing the scan only when the scan history indicates that the file has been modified since the last scan or that the file has not been previously scanned.

30. The machine readable storage medium of claim 29, wherein the signature is a hash of the content of the file.

31. The machine readable storage medium of claim 30, wherein the file is accessible to each of the plurality of guest VMs, and each of the plurality of guest VMs includes a corresponding driver portion for intercepting file accesses within a corresponding one of the VMs, wherein the scan engine returns the negative result without performing a new scan when the scan history indicates the file has been previously scanned, the previous scan found the file to be free of malicious code, and the file has not been modified since the previous scan regardless as to which driver portion previously requested the previous scan.

32. The machine readable storage medium of claim 12, wherein the identification of the location of the file comprises guest physical page numbers identifying locations in guest physical memory where content of the file is stored by the driver portion.

33. The machine readable storage medium of claim 32, wherein the driver portion stores the content of the file in the guest physical memory indirectly via an agent program that executes within the context of the target VM on behalf of the driver portion.

34. The machine readable storage medium of claim 32, wherein the scan engine obtains physical page numbers of physical pages of system memory corresponding to the guest physical page numbers obtained for the driver portion.

35. The machine readable storage medium of claim 34, wherein:
the scan engine maintains a scan history that identifies previously scanned data that has been identified as being free of malicious code; and
the scan engine, upon receiving from the driver portion the information identifying a location of the data to be scanned, consults the scan history to determine whether the data to be scanned corresponds with data that has previously been successfully scanned, the scan engine performing the scan only when the scan history indicates that one or more of the physical pages has been modified since the last scan or that the file has not been previously scanned.

36. The machine readable storage medium of claim 35, wherein the scan history includes a signature for each file that the scan engine determines to be free of malicious code
wherein the scan engine, upon receiving from the driver portion the information identifying the location of the data to be scanned, compares a new signature generated from the data to be scanned and compares the new signature with signatures in the scan history, the scan engine performing the scan only when the signatures in the scan history does not include a matching signature.

37. The machine readable storage medium of claim 36, wherein the file is accessible to each of the plurality of guest VMs, and each of the plurality of guest VMs includes a corresponding driver portion for intercepting file accesses within a corresponding one of the guest VMs, and the scan history includes signatures for files scanned for each of the plurality of guest VMs.

38. A system for protecting a plurality of guest virtual machines (VMs) from malicious code, the plurality of guest VMs executing via a virtualization layer on a common host platform, the system implemented by a computer, the system comprising:
a scan engine configured to scan data for malicious code and determine a result of the scanning, the result indicating whether malicious code is present in the data;
a driver portion configured for installation in an operating system of a target VM, the target VM being one of the guest VMs, the driver portion intercepting an access request to a file, wherein the access request originates within the target VM, the driver portion further communicating information identifying a location of the data to be scanned by the scan engine without sending a copy of the data to the scan engine, the data to be scanned being or corresponding to contents of the file, the driver portion furthermore receiving the result of the scan communicated by the scan engine; and
a communication portion configured to facilitate communication between the scan engine and the driver portion;
wherein the scan engine is configured to execute on the host platform logically isolated from the target VM, the communication portion facilitates the communicating of the information and the result between the driver portion and the scan engine, and at least one of the driver portion or the scan engine causes a remedial action to be carried out when the result indicates that malicious code is present in the data.

39. The system of claim 38, wherein the scan engine is configured to execute in the virtualization layer.

40. The system of claim 38, wherein the scan engine is configured to execute within a scanning VM, the scanning VM executing on the host platform via the virtualization layer, the scan request being received by the scanning VM via the virtualization layer.

41. The system of claim 38, wherein the remedial action comprises notifying a component of the virtualization layer to carry out VM-level action, the VM-level action comprising one or more of creating a snapshot of the guest VM, starting a recording that traces execution of the guest VM, disconnecting the guest VM from the network, and suspending the guest VM.

42. The system of claim 38, wherein the remedial action comprises wherein the remedial action comprises one or more of notifying a user, deleting a file, or quarantining the file.

43. The system of claim 38, wherein the scan engine, upon receiving from the driver portion the information identifying a location of the data to be scanned, consults a history of previous scan locations, the scan engine performing the scan only when the scan history indicates that the data has been modified since the last scan or that the data has not been previously scanned.

* * * * *

UNITED STATES PATENT AND TRADEMARK OFFICE
CERTIFICATE OF CORRECTION

| | | |
|---|---|---|
| PATENT NO. | : 8,010,667 B2 | Page 1 of 1 |
| APPLICATION NO. | : 12/855498 | |
| DATED | : August 30, 2011 | |
| INVENTOR(S) | : Yufeng Zheng et al. | |

It is certified that error appears in the above-identified patent and that said Letters Patent is hereby corrected as shown below:

ON THE TITLE PAGE:

Title page item (75) Inventors, replace "Yufeng Zhang" with -- Yufeng Zheng --.

Signed and Sealed this
Eighteenth Day of October, 2011

David J. Kappos
*Director of the United States Patent and Trademark Office*